F. J. J. DELORI.
Apparatus for Measuring, Controlling, and Registering Liquids.
No. 200,184. Patented Feb. 12, 1878.

Witnesses
R. J. Kirkpatrick
F. Dubois Plancke

Inventor
François Jean Joseph Delori

UNITED STATES PATENT OFFICE.

FRANÇOIS JEAN JOSEPH DELORI, OF SNAESKERKE, BELGIUM.

IMPROVEMENT IN APPARATUS FOR MEASURING, CONTROLLING, AND REGISTERING LIQUIDS.

Specification forming part of Letters Patent No. 200,184, dated February 12, 1878; application filed November 6, 1877.

*To all whom it may concern:*

Be it known that I, FRANÇOIS JEAN JOSEPH DELORI, of Snaeskerke, in the Kingdom of Belgium, sugar-manufacturer, have invented an improved apparatus for measuring, controlling, and registering the volume and density of alcohol, beet-root juice, and other liquids, of which the following is a specification:

My invention has for its object an apparatus for measuring, controlling, and registering the volume and density of liquids generally, and, in particular, alcohol, beet-root juices, beer, &c.

The said apparatus may be advantageously used by large wine and sugar manufacturers, distillers, brewers, and others, and also for ascertaining and controlling the amount of excise duty, and for other purposes.

My apparatus may be single or double, and, if desired, may be provided with a reservoir, and when used for government purposes, for controlling or ascertaining the excise duty, it should be mounted in a building or place agreed upon by the government officials and the manufacturers.

Figure 1:
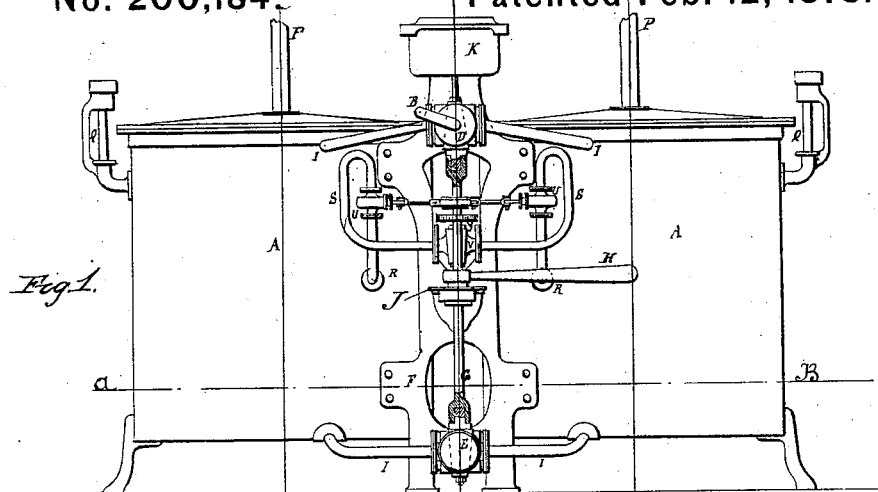
Figure 2:
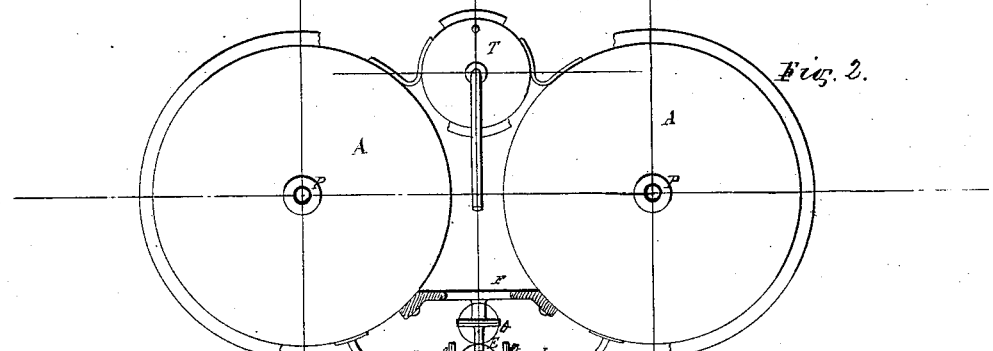
Figure 3:
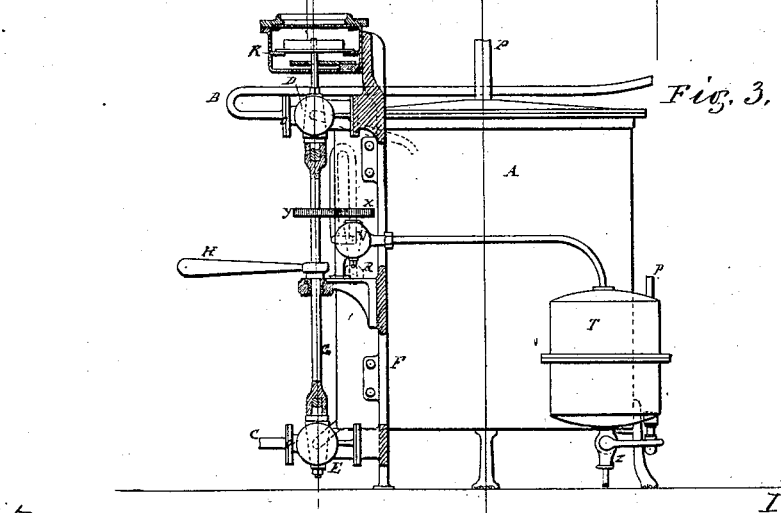

Figure 1 of the accompanying drawings represents, in elevation, an apparatus for measuring, controlling, and registering the volume and density of liquids, constructed according to my invention. Fig. 2 is a horizontal section of the same, taken through the line A B, Fig. 1. Fig. 3 is a side view of the same, partly in section.

The said apparatus consists of one or two measuring-vessels, A A, of ascertained capacity, hereinafter called "measurers." The said measurers are entirely closed when used in distilleries, and are open when used in sugar-manufactories. They are slightly elevated from the ground, and rest upon metal legs.

B is the inlet pipe or tube for the liquid, and C is the outlet pipe or tube. The cock D, for which might be substituted any suitable valve or slide, governs the inlet of liquid into the measurers, and E is the outlet-cock. The cocks D and E are so arranged and operated that, when the inlet-pipe B is open, the outlet-pipe C is closed, and vice versa. A cast-iron bracket or standard, F, fixed to the measurers, supports the cocks and actuating mechanism. The distance between the horizontal axes of the said cocks is, therefore, invariable. G is a spindle connecting together and working the two cocks D and E.

I I are pipes soldered to the measurers A A, and riveted to the cocks D and E, or secured thereto by sealed screw-bolts. K is a simple and strong meter, worked by any suitable means, and inclosed in a box or chest, so that it cannot be tampered with.

O O O are riveted joints, the rivets having upon them secret marks, which are enrolled in the register of the instruments at the depot of the apparatus.

In countries where the breaking of a seal is punished as forgery, the use of sealed screw-bolts is to be recommended.

P P P are air-pipes on the measurers A, on the reservoir T, and on the sampling-pipes S. The ends of the said air-pipes open into a sealed iron box or chest, fixed at any point about three feet above the bottoms of the refrigerators ordinarily used in a distillery. Q Q are gages indicating the level of the liquid in the measurers A A, and so arranged as to prevent fraud. The said gages may be arranged so as to indicate at any moment the volume of liquid contained in the measurers.

From the above description the mode of operating will be readily understood. It will be seen that, by means of the apparatus described, the volume of liquid entering through the pipe B and passing out through the pipe C can be accurately determined, notwithstanding any attempts at fraud, even if made in concert with the controlling officers.

The density of the liquid is determined as follows: Tubes S, of the form of an inverted U, open into the measurers A at about the middle of their height at R. The said tubes S, which rise to the height of the covers, may be provided with a spherical reservoir, and to each of the said tubes S, and also to the reservoir T, may be fitted air-pipes of about one-eighth of an inch in diameter, opening into the sealed box hereinbefore described. U U are small valves, slides, or cocks, arranged so that they close the tube S when the corresponding measurer is being emptied, and keep it open when the said measurer is being filled. The said valves, slides, or cocks U are actuated by the motion of the spindle G by any suitable means. While the measurer is filling the liquid rises in the branch of the tube S until it reaches the bend of the said tube. It then flows over and fills the other part of the tube, its flowing being arrested by the plug of the sampling-cock V, which cock V is affixed to the bracket F. Upon the plug of the said cock V is formed or affixed a toothed wheel, X. The volume of liquid contained in the tube S constitutes the sample charge taken each time from about the middle of the measurer when the measurer is nearly filled. It, therefore, is of the exact mean average quality of the liquid contained in the said measurer. Upon the spindle G is affixed a toothed pinion, Y, which gears with the wheel X, and consequently actuates the sampling-cock V. When the cock E is opened for the purpose of emptying the measurer, the inlet-cock D for admitting liquid thereto is closed, and the sampling-cock V is opened, and simultaneously the valve U is closed. All the liquid contained in the tube S then flows down into the reservoir T, where it is shut up. A cock, Z, having two ways through it, and a secret combination-lock close the reservoir T. The areas of the openings in the plug of the cock Z are in an ascertained proportion one to the other. The cock Z, when opened, will allow the liquid in the reservoir T to flow partly into an outer gaged vessel of known capacity, and partly into a second reservoir, the density of the contents of which can only be controlled by the superior officers of the excise. The volume of the sample charge being constant, the mean ascertained density will be equal to the actual density of the liquid drawn off. It is well to observe that the volume of the liquid inclosed in the reservoir being measured may be made to control the meter, or indicator of the number of times the measurers have been emptied. A gage indicating the number of measurers emptied may be applied to the apparatus. The excise officers and others can therefore, for various purposes, ascertain exactly the volume and the density, or the volume only, of the liquid passing through a given pipe.

In sugar-manufactories the measurer is open, and should be placed in a special room. The opening R is protected against any attempt to close it by any suitable means.

The measurer may be provided with a copper gutter, with a large return-tube leading to the pulp-vat.

Any suitable means may be used to prevent the alteration of the sampling-charges for five or six hours, or even more.

An indicator may be used to indicate to the operator in the room in which is the apparatus when the measurer is full by means of a loud bell or alarm. A marking apparatus indicates the duration of the filling, so as to guard the manufacturer against any malicious act of the workmen. Overflow-reservoirs may be used. The English *eprouvette* may also be advantageously used with my measuring apparatus.

When large measurers are used, the sampling-cock V may be placed as low as possible, and the samples will be taken from different points of the height of the measurer. The emptying of the samples will only take place after the measurer has been completely emptied, the apparatus being regulated for the purpose.

Having thus described the nature of my invention, and in what manner the same is to be performed, I claim—

1. The combination of the measuring-tanks, having top inlet and bottom outlet pipes, the sampling-tank, pipes S, valves U, spindle G, and connecting-rods operated by an eccentric on said spindle, substantially as described.

2. The combination of cock E, spindle G, pipe S and valve U, and connecting-rod operated by an eccentric on said spindle, substantially as set forth.

FRANÇOIS JEAN JOSEPH DELORI.

Witnesses:
R. S. KIRKPATRICK,
F. DuBois PLANCKE.